UNITED STATES PATENT OFFICE.

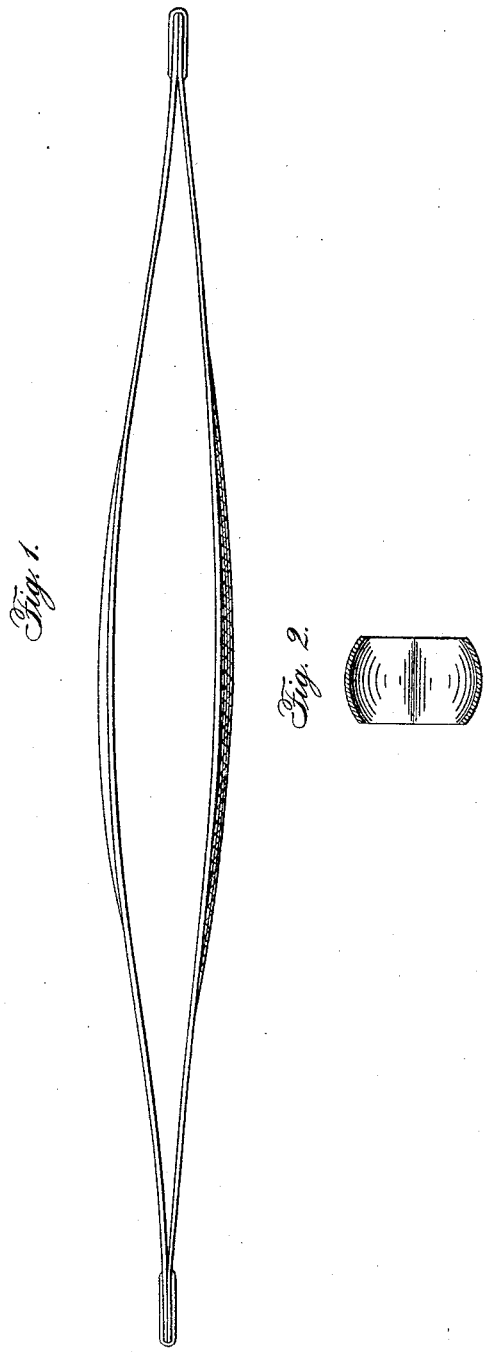

SUMNER KING, OF SUFFIELD, CONNECTICUT.

ELLIPTICAL SPRING FOR CARRIAGES.

Specification of Letters Patent No. 1,387, dated October 31, 1839.

*To all whom it may concern:*

Be it known that I, SUMNER KING, of Suffield, Hartford county, State of Connecticut, have invented a new and useful Improvement in the Construction of Carriage-Springs, which is described as follows, reference being had to the annexed drawings of the same, making part of this specification.

Figure 1 is a side view of an elliptic spring. Fig. 2 is a section showing the transverse convexity of the leaves.

The nature of this invention consists in making the leaves of springs convex or concave transversely instead of flat by which formation they are rendered much stronger than the common springs. The greatest convexity or concavity is in the center and decreases gradually toward the ends when the leaves are made flat for a proper union of the same.

What I claim as my invention and desire to secure by Letters Patent consists in—

Making the leaves of springs convex or concave transversely as before described, gradually diminishing from the center toward the ends.

SUMNER KING.

Witnesses:
   WM. P. ELLIOT,
   WM. BISHOP.